United States Patent
van der Linde et al.

(10) Patent No.: US 6,724,162 B2
(45) Date of Patent: Apr. 20, 2004

(54) MOTOR-CONTROL DEVICE ENABLING THE ROTATIONAL SPEED OF THE MOTOR'S ROTOR TO BE MEASURED

(75) Inventors: Jannis Pieter van der Linde, Eindhoven (NL); Henricus Marinus van Hout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 86 days.

(21) Appl. No.: 09/950,845

(22) Filed: Sep. 12, 2001

(65) Prior Publication Data

US 2002/0060539 A1 May 23, 2002

(30) Foreign Application Priority Data

Sep. 12, 2000 (FR) .......................................... 00 11589

(51) Int. Cl.$^7$ ................................................. H02P 3/08
(52) U.S. Cl. .................... 318/254; 318/439; 318/138; 318/459; 318/500; 388/923; 388/928.1; 360/75; 360/78.12; 360/78.04; 360/69
(58) Field of Search ........................... 318/138, 439, 318/254, 459, 500; 388/923, 928.1; 360/75, 69, 78.04, 78.12

(56) References Cited

U.S. PATENT DOCUMENTS

| | | | | |
|---|---|---|---|---|
| 4,237,501 A | * | 12/1980 | Barmache et al. ............ 360/75 |
| 4,679,102 A | * | 7/1987 | Wevers et al. ............... 360/75 |
| 4,786,995 A | * | 11/1988 | Stupeck et al. .............. 360/75 |
| 5,166,583 A | * | 11/1992 | Min et al. ................... 318/138 |
| 5,486,957 A | * | 1/1996 | Albrecht ..................... 360/75 |
| 5,491,393 A | * | 2/1996 | Uesugi ....................... 318/439 |
| 5,504,402 A | * | 4/1996 | Menegoli .................... 318/377 |
| 5,521,476 A | | 5/1996 | Bartlett ...................... 318/563 |
| 5,569,988 A | * | 10/1996 | Kokami et al. ............. 318/254 |
| 5,818,180 A | * | 10/1998 | Canclini .................... 318/254 |
| 5,869,946 A | * | 2/1999 | Carobolante ............... 318/811 |
| 5,889,629 A | * | 3/1999 | Patton, III .................. 360/75 |
| 6,204,629 B1 | * | 3/2001 | Rote et al. .................. 318/803 |
| 6,363,214 B1 | * | 3/2002 | Merello et al. ............. 388/928.1 |
| 6,392,375 B1 | * | 5/2002 | Portaluri et al. ........... 318/459 |
| 6,560,057 B1 | * | 5/2003 | Klaassen et al. ............ 360/75 |

FOREIGN PATENT DOCUMENTS

| | | | |
|---|---|---|---|
| WO | WO0036604 | 6/2000 | ........... G11B/21/12 |
| WO | WO0051118 | 8/2000 | ........... G11B/19/20 |

OTHER PUBLICATIONS

Patent Abstracts of Japan, "Magnetic Disk Device," Tanaka Shinji, Publication No. 09213035, Aug. 15, 1997, Application No. 08017869, Feb. 2, 1996.

* cited by examiner

Primary Examiner—Rina Duda
(74) Attorney, Agent, or Firm—Peter Zawilski

(57) ABSTRACT

A device for controlling a motor intended to set an arm provided with a head for reading/writing information in motion with respect to a surface carrying information. The device having a controller for enabling the power supply of the winding of the motor to be managed and a measurer for measuring the value of a counter-electromotive force induced in the winding by the movement of the rotor when the power supply of the winding is interrupted. This device enables the angular speed of the arm to be measured and controlled during an emergency return phase of the arm towards a rest position.

6 Claims, 3 Drawing Sheets

MOTOR-CONTROL DEVICE ENABLING THE ROTATIONAL SPEED OF THE MOTOR'S ROTOR TO BE MEASURED

BACKGROUND OF THE INVENTION

The invention relates to a device for controlling a motor comprising a rotor provided with a winding and a stator.

An apparatus wherein such a device is employed is described in European patent application EP 0 859 456 A1. This apparatus comprises an arm provided with a head for reading/writing information, which arm is intended to be made to move by the motor mentioned hereinabove, and a second, so-called disk motor intended to bring about rotation of a disk whose surface carries information, for example a magnetic hard disk for computers. Each motor is provided with input terminals, commonly referred to as supply terminals, which are connected to one or more windings intended to produce a magnetic field enabling the motor's rotor to be set in motion. Each of the supply terminals is connected to a power supply circuit intended to supply energy to the winding during standard operation of the apparatus. When the power supply of the apparatus is suddenly interrupted, the rotor of the second motor, which is driven by the kinetic energy from the disk, keeps rotating, thereby generating a counter-electromotive force at its supply terminals, so that the second motor serves as a generator. This counter-electromotive force, which acts as a substitute for the supply voltage of the motor of the arm during a so-called emergency return phase, must enable said motor to move the arm towards a rest zone which is embodied such that the arm can rest there without causing damage to the read/write head.

In the known device, the value of the voltage applied to the winding of the motor of the arm is not controlled during said emergency return phase, which can be attributed to the fact that said voltage is intended to vary as a function of the rotational speed of the disk. This implies that the speed of the arm is not controlled either.

Consequently, there is a possibility that the arm is moved towards the rest zone at a high speed, which may cause the arm to collide with a stop intended to keep the arm in the rest position, which collision may cause the arm to rebound in the direction of the disk, causing the read head and the disk to violently contact each other, leading to possible damage of the two elements.

Conversely, if the speed of the arm is too low during the emergency return phase, the arm may not have sufficient time to complete its movement towards the rest zone before the counter-electromotive force generated by the second motor disappears following the end of the rotation of the disk, which occurs inevitably when its kinetic energy has dissipated entirely. In this case, the read/write head will land on the disk instead of on the rest zone, which may cause damage to the head as well as the disk.

For this reason, it is an object of the invention to overcome these drawbacks by providing a control device wherein the speed of the arm can be measured.

BRIEF SUMMARY OF THE INVENTION

In accordance with the invention, a control device in accordance with the opening paragraph comprises:

control means which make it possible to manage the power supplied to the winding of the rotor of the motor of the arm, and means for measuring the value of a counter-electromotive force induced into said winding by the movement of the rotor when the power supply of the winding of the rotor is interrupted.

In this control device, the counter-electromotive force generated by the rotor of the motor of the arm is measured for a brief period of time during which the winding is not energized. During this period of time, consequently, the speed of the arm is constant and proportional to the counter-electromotive force whose value is measured. The value measured by the measuring means thus is representative of the speed of the arm.

As the speed of the arm can be measured by virtue of the invention, it is possible to control said speed in order to make sure that the displacement of the arm towards the rest zone occurs in the best possible conditions.

For that purpose, the invention enables the speed of the arm to be measured at different instants during its travel towards the rest zone, to compare the values thus measured with predetermined values corresponding to an optimum travel, and to regulate the effective speed of the arm in order to make sure that the travel of the arm is in conformity with the optimum travel.

In such an embodiment of the invention, the control device described hereinabove additionally comprises comparison means intended to supply a command signal that is representative of a comparison between the value of a reference voltage and the value of the counter-electromotive force supplied by the measuring means, said control means being regulated by the command signal.

In a particular embodiment of the invention, the control means comprise a transistor whose main current path extends between a voltage source and a terminal of the winding of the rotor, the conduction of said transistor being controlled by the command signal.

This embodiment is advantageous because it provides a specific power supply circuit for the winding of the motor of the arm, which is activated during the emergency return phase and separated from the circuit responsible for supplying power to this winding during the standard mode of operation. As the specific power supply circuit is regulated by the command signal, the speed of the arm can be regulated readily and quasi instantly.

In accordance with a particularly advantageous embodiment of the invention, the value of the reference voltage varies monotonically in the course of time.

This embodiment enables the speed of the arm to be reduced in a continuous and controlled manner, such that said arm reaches the rest zone at a speed which is sufficiently low to avoid any rebound.

In accordance with the foregoing, the invention also relates, in one of its applications, to an apparatus enabling information to be written on the surface of a carrier provided for this purpose, and enabling said information to be read using a read/write head which is carried by an arm, which arm is intended to be made to move with respect to this carrier by means of a first motor, said carrier being intended to be made to move by means of a second motor, which apparatus is characterized in that the first motor is regulated by means of a control device as described hereinabove.

BRIEF DESCRIPTION OF THE SEVERAL VIEWS OF THE DRAWINGS

These and other aspects of the invention will be apparent from and elucidated with reference to the non-limitative exemplary embodiment and the annexed drawings, wherein.

DETAILED DESCRIPTION OF THE INVENTION

Figure 1:
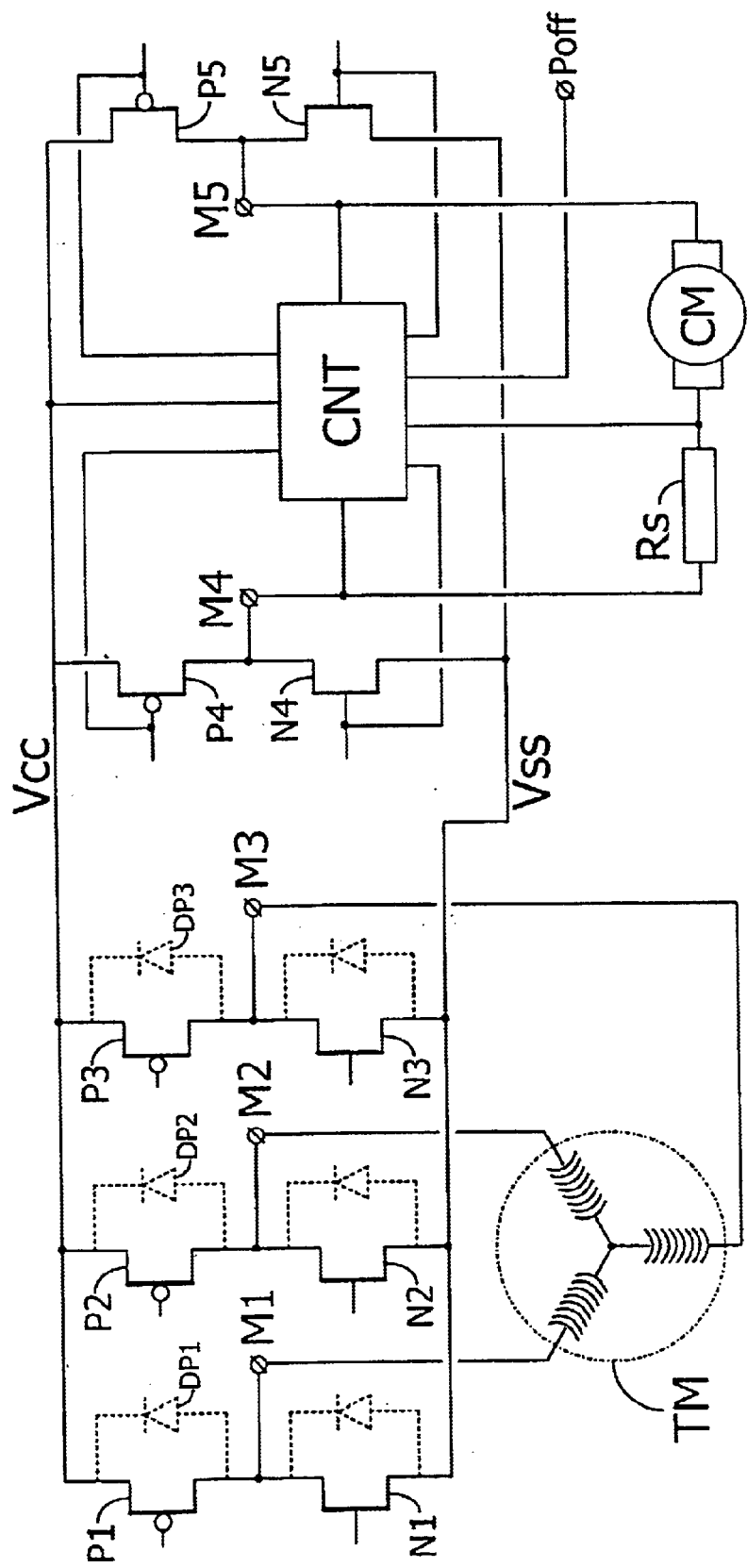
FIG. 1 shows a part of a functional diagram of a control device in accordance with the invention.

FIG. 1 diagrammatically shows a control device of a first direct current motor CM, which is intended to set an arm provided with a head for reading/writing information in motion with respect to an information-carrying disk which is made to rotate by a second three-phase motor TM. The first and the second motor CM and TM, respectively, are provided with input terminals (M4, M5) and (M1, M2, M3), respectively. Each supply terminal M1 is connected to a winding of the corresponding motor, which winding is intended to produce a magnetic field enabling the rotor of the motor in question to be set in motion. Each one of the supply terminals M1 (where i=1 to 5) is connected to a power supply circuit, formed by additional power transistors (Pi, Ni) which are intended to be alternately activated to ensure the energy supply of the winding during operation in the standard mode. In this example, the power supply circuit of the first motor CM comprises a precision resistor Rs which is arranged between the supply terminal M4 and the winding of the first motor CM. The function of this precision resistor Rs will be explained hereinbelow.

In the case of a sudden power outage, the rotor of the second motor TM, which is driven by its kinetic energy and the kinetic energy of the disk to which it is firmly attached, continues rotating and produces a counter-electromotive force at its supply terminals (M1, M2, M3), in which case the second motor acts as a generator. This counter-electromotive force may act as a substitute for the supply voltage VCC of the first motor CM during a so-called emergency return phase, during which the first motor CM may tap current from the second motor TM by means of the diodes DP1, DP2 or DP3, which are generally parasitic diodes present in the power transistors P1, P2 and P3. This enables the first motor CM to displace the arm towards a rest zone, which is embodied so as to enable the arm to rest without causing damage to the read/write head.

The control device shown here comprises:
control means enabling the power supply of the winding of the rotor to be managed, and
means for measuring the value of a counter-electromotive force induced into said winding by the movement of the rotor when the power supply of the winding of the rotor is interrupted.

The measuring and control means are integrated in a control module CNT. In accordance with the invention, the counter-electromotive force generated by the rotor of the first motor CM is measured for a short period of time during which the winding of this motor is not energized.

During this period of time, a signal Poff orders the control module CNT to render the transistors N4 and N5 conducting and to block the transistors P4 and P5. As a result, the speed of the arm is constant and proportional to the counter-electromotive force whose value is measured. The value measured by the measuring means thus is representative of the speed of the arm.

Figure 2:
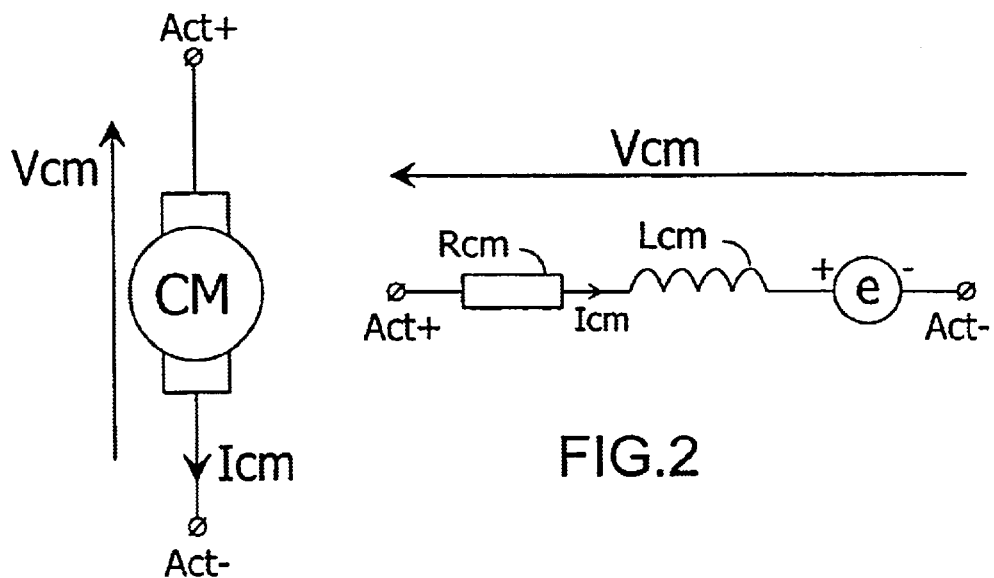
FIGS. 2A–2B is an electrical wiring diagram showing the electrical characteristics of a motor of the arm.

FIG. 2 shows an equivalent circuit of the first motor CM when said motor is used as a generator, i.e. when the power supply of the winding is interrupted while the rotation of the rotor continues as a result of its kinetic energy, said rotor being placed in a permanent magnetic field generated by interdependent magnets of the stator. This motor comprises a winding having two terminals Act+ and Act−, between which the winding generates a voltage Vcm, and a current Icm flows through said winding. The motor CM thus is equivalent to a series arrangement of a resistor RCM corresponding to the resistor of the winding, an inductor Lcm corresponding to the inductor of the winding, and a voltage generator e corresponding to the counter-electromotive force generated by the movement of the rotor placed in a magnetic field. When the current Icm is constant, the counter-electromotive force e can be expressed by the equation e=Vcm−(Rcm.Icm).

Figure 3:
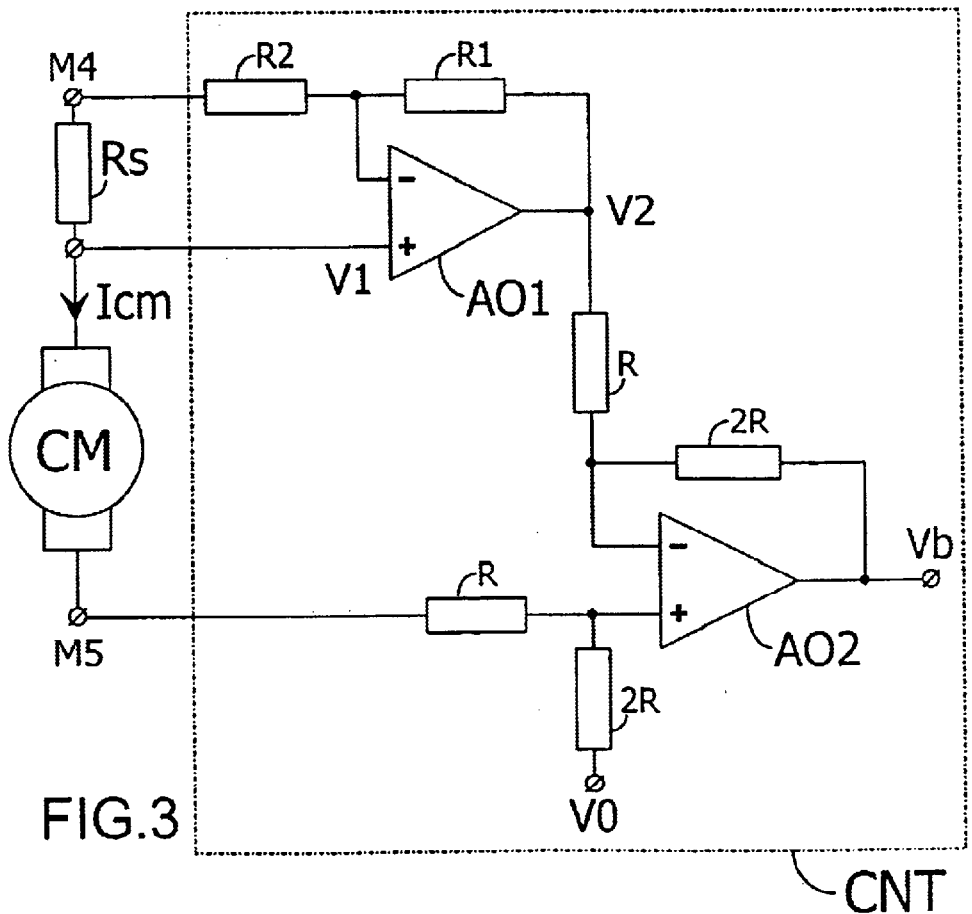
FIG. 3 is a functional diagram showing measuring means in accordance with a particular embodiment of the invention.

FIG. 3 shows an embodiment of means for measuring the counter-electromotive force induced in the winding of the motor CM when the power supply of this winding is interrupted. These measuring means are included in the control module CNT and comprise a first and a second operational amplifier AO1 and AO2, respectively. If V1 denotes the potential of an intermediate terminal between the precision resistor Rs and the motor CM, the first operational amplifier, which is arranged so as to be an inverting amplifier, supplies a signal V2 which can be expressed by the equation $$V2=V1-(Rs.Icm.R1/R2).$$

The second operational amplifier, which is arranged so as to be a subtracter, supplies a signal Vb that can be expressed by the equation $Vb=2.[V(M5)-V2]+V0$.

If, in accordance with the notations of FIG. 2, the equation $V(M5)-V1=-Vcm$ is considered to be true, and the following choice is made: $Rs.R1/R2=Rcm$, the following equation is obtained $Vb=-2.[Vcm-(Rcm.Icm)]+V0$, or $Vb=-2.e+V0$.

The signal supplied by the second operational amplifier AO2 thus is representative of the counter-electromotive force induced in the winding of the motor CM. The measuring means thus enable the rotational speed of the rotor of this motor CM to be measured when its energy supply is interrupted.

Figure 4:
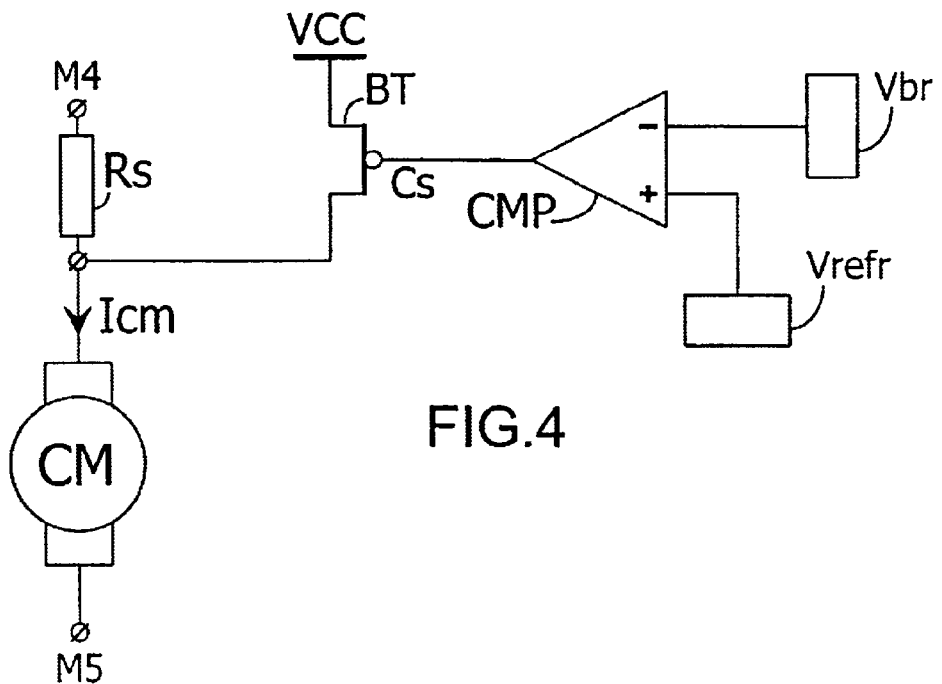
FIG. 4 is a functional diagram showing control means and comparison means in accordance with a particular embodiment of the invention, and FIG. 5 diagrammatically shows an apparatus wherein the invention is employed.

FIG. 4 shows an embodiment of the control means including comparison means intended to supply a command signal Cs which is representative of a comparison between a reference value, stored, in this case, in a register Vrefr, and the value of the signal provided by the measuring means, which is representative of the rotational speed of the rotor of the first motor, and which is stored, in this case, in a register Vbr. The comparison means are formed, in this example, by a digital comparator CMP. In other embodiments, it is possible to employ an analog comparator which directly receives the signal supplied by the measuring means and an analog reference signal.

The command signal controls the conduction of a transistor BT whose main current path extends between the supply terminal VCC and the winding of the first motor CM. Taking into account that $Vb=-2.[Vcm-(Rcm.Icm)]+V0$, the value of the command signal Cs is positive as long as the rotational speed of the disk is below the value defined by means of the reference value. In that case, the transistor BT is conducting and supplies power to the winding of the motor CM so as to increase the rotational speed of the latter. When the rotational speed of the disk is higher than the value defined by means of the reference value, the command signal Cs becomes negative, causing the conduction of the transistor Bt and the power supply of the winding of the motor CM to be interrupted, resulting in a reduction of the rotational speed of the latter.

Means which are not shown in the Figure, such as an interrupter controlled by the signal Poff, enable the transistor BT to be blocked during the interval necessary to measure the rotational speed of the motor CM.

Consequently, the invention enables the speed of the arm moved by the motor CM to be measured at different instants during its travel towards the rest zone, to compare the values thus measured with predetermined values corresponding to the optimum travel, while changing the content of the register Vrefr by means of software, and to regulate the effective speed of the arm in order to make sure that the travel of the arm is in conformity with the optimum travel.

In particular, if the content of the register Vrefr is programmed such that the reference value varies monotonically, so that said reference value, for example, decreases continuously in the course of time, the speed of the arm can be continuously reduced so that the arm reaches the rest zone at a speed which is practically zero.

Figure 5:
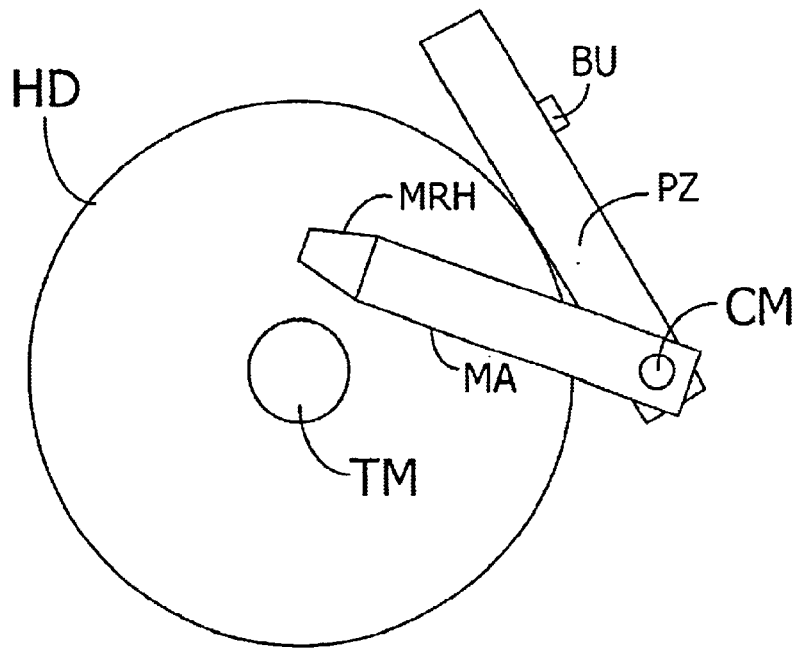

FIG. 5 diagrammatically shows an apparatus for storing information, in which the invention will be advantageously employed. This apparatus comprises an arm MA provided with a head for reading/writing information MRH, which arm MA is intended to be made to move by means of a first motor CM with respect to a surface carrying information, in this case a hard disk HD. A second motor TM is intended to impart a rotating movement to the disk HD.

When the power supply of the apparatus is suddenly interrupted, the rotor of the second motor TM, which is driven by the kinetic energy from the disk HD, keeps rotating, thereby generating a counter-electromotive force at its supply terminals, so that the second motor serves as a generator TM. This counter-electromotive force, which acts as a substitute for the supply voltage of the first motor CM during a so-called emergency return phase, must enable said motor CM to displace the arm MA towards a rest zone PZ, which is embodied so as to enable the arm MA to rest without causing damage to the read/write head MRH. In the example shown here, the rest zone is situated outside the disk. In other applications, the rest zone may be provided on the disk HD itself.

The invention enables the angular speed of the arm MA to be measured and regulated in order to make sure that said arm MA travels at a speed which is sufficient to reach the resting zone PZ, said speed of the arm MA being sufficiently low, however, towards the end of the travel to make sure that the arm MA does not rebound from a stop BU intended to keep the arm MA in place in the rest zone PZ.

What is claimed is:

1. A device for controlling a motor comprising a rotor provided with a winding and a stator, comprising:
    control means which make it possible to manage a power supply of the winding, means for measuring a value of a counter-electromotive force induced into said winding by a movement of the rotor when the power supply of the winding is suddenly interrupted and the motor is in an emergency return phase; and
    comparison means that supplies a command signal, which is representative of a comparison between a value of a reference voltage and the value of the counter-electromotive force supplied by the measuring means, the control means being regulated by the command signal and wherein the value of the reference voltage varies monotonically in time.

2. A control device as claimed in claim 1, wherein the control means comprise a transistor whose main current path extends between a voltage source and a terminal of the winding of the rotor, conduction of said transistor being controlled by the command signal.

3. An apparatus enabling information to be written on the surface of a carrier provided for this purpose, and enabling said information to be read using a read/write head which is carried by an arm, which arm is intended to be made to move with respect to this carrier by means of a first motor, said carrier being intended to be made to move by means of a second motor, wherein the first motor is regulated by means of a control device, comprising:
    control means adapted to manage a power supply of a winding of the first motor;
    means for measuring a value of a counter-electromotive force induced into said winding by a movement of a rotor of the first motor when the power supply of the winding is suddenly interrupted and the first motor is in an emergency return phase; and
    comparison means that supply a command signal that is representative of a comparison between a value of a reference voltage and the value of the counter-electromotive force supplied by the measuring means, the control means being regulated by the command signal and wherein the value of the reference voltage varies monotonically in time.

4. A control device for controlling a motor having a winding and a rotor, comprising:
    a controller, said controller controlling a power supplied to said winding;
    a measuring circuit, said measuring circuit measuring a value of a counter-electromotive force induced into said winding by the movement of the rotor when the power supply of the winding is suddenly interrupted and the motor is in an emergency return phase; and
    a command circuit for supplying a command signal that is representative of a comparison between a value of a reference voltage and the value of said counter-electromotive force supplied by said measuring circuit, the control circuit being regulated by said command signal and wherein said value of said reference voltage varies monotonically in time.

5. A control device as claimed in claim 4, wherein the control circuit comprises a transistor whose main current path extends between a voltage source and a terminal of said winding, a conduction of said transistor being controlled by said command signal.

6. An apparatus enabling information to be written on a surface of a carrier provided for this purpose, and enabling said information to be read using a read/write, said apparatus comprising:
    A first motor for moving said arm, said first motor having a winding and a rotor;
    A second motor for moving said carrier; and
    A control device for controlling said first motor, said control device comprising a controller, said controller controlling a power supplied to said winding;
    a measuring circuit, said measuring circuit measuring a value of a counter-electromotive force induced into said winding by movement of said rotor when said-power supply of said winding is suddenly interrupted and said first motor is in an emergency return phase; and
    a command circuit for supplying a command signal that is representative of a comparison between a value of a reference voltage and the value of said counter-electromotive force supplied by said measuring circuit, the control circuit being regulated by said command signal and wherein said value of said reference voltage varies monotonically in time.

* * * * *

Disclaimer

Patent No. 6,724,162 - Jannis Pieter van der Linde, Eindhoven; Henricus Marinus van Hout, Eindhoven, all of NL. MOTOR-CONTROL DEVICE ENABLING THE ROTATIONAL SPEED OF THE MOTOR'S ROTOR TO BE MEASURED. Patent dated Apr. 20, 2004. Disclaimer filed Jun. 24, 2008, by the assignee, KONINKLIJKE PHILIPS ELECTRONICS N.V.

Hereby enters this disclaimer to all claims of said patent.

*(Official Gazette September 23, 2008)*